United States Patent [19]

Chiang

[11] 4,415,439
[45] Nov. 15, 1983

[54] CATALYTIC CRACKING CATALYST

[75] Inventor: Robert L. Chiang, Columbia, Md.

[73] Assignee: W. R. Grace & Co., New York, N.Y.

[21] Appl. No.: 375,235

[22] Filed: May 5, 1982

Related U.S. Application Data

[60] Division of Ser. No. 298,671, Sep. 2, 1981, which is a continuation of Ser. No. 201,616, Oct. 28, 1980, abandoned.

[51] Int. Cl.³ .............................................. C10G 11/05
[52] U.S. Cl. ...................................... 208/120; 208/16; 208/52 CT; 208/138; 208/DIG. 2; 252/455 Z; 585/419; 502/65.79
[58] Field of Search ........................................ 208/120

[56] References Cited

U.S. PATENT DOCUMENTS

| | | |
|---|---|---|
| 3,449,070 | 6/1969 | McDaniel et al. .............. 252/455 Z |
| 3,455,842 | 7/1969 | Cornelius et al. ............... 252/455 Z |
| 3,677,973 | 7/1972 | Mitsche et al. .................. 252/455 Z |
| 3,798,177 | 3/1974 | Reed et al. ....................... 252/455 Z |
| 4,224,188 | 9/1980 | Alafandi et al. ................ 252/455 Z |
| 4,289,608 | 9/1981 | McArthur .......................... 208/121 |
| 4,317,713 | 3/1982 | Burk et al. .......................... 208/113 |
| 4,357,265 | 11/1982 | Chiang ............................ 208/120 X |

Primary Examiner—Curtis R. Davis
Assistant Examiner—George E. Schmitkons
Attorney, Agent, or Firm—Arthur P. Savage

[57] ABSTRACT

Catalysts which produce cracked gasoline having high octane rating are produced by combining a thermally-stabilized/aluminum exchanged type Y zeolite with an inorganic oxide matrix.

6 Claims, No Drawings

CATALYTIC CRACKING CATALYST

This is a division of application Ser. No. 298,671, (now U.S. Pat. No. 4,357,265) filed 9/2/81, which is a continuation of Ser. No. 201,616, filed Oct. 28, 1980, now abandoned.

The present invention relates to the production of catalytic cracking catalysts and more specifically to aluminum exchanged type Y zeolite containing catalysts which produce high octane cracked gasoline.

Zeolite promoted cracking catalysts which produce substantial yields of gasoline by the catalytic cracking of petroleum gas oil feedstocks have been in commercial use for several years.

Canadian Pat. No. 848,966 describes a catalytic cracking catalyst which contains a thermally stabilized type Y zeolite, i.e. Z14US, which may be exchanged with a variety of metal cations including aluminum ions. The gasoline fractions produced using Z14US zeolite containing cracking catalyst have good octane ratings.

U.S. Pat. Nos. 3,293,192; 3,375,065; 3,402,996; 3,449,070 and 3,595,611 describe methods for preparing thermally stabilized type Y zeolites such as Z14US zeolite. The methods disclosed in these references typically involve exchange of a sodium type Y zeolite with ammonium ions, calcination and further ammonium/metal cation exchange.

U.S. Pat. No. 3,455,842 describes preparation of an ammonium/aluminum exchange type Y zeolite which is used in the preparation of catalytic cracking catalysts.

The zeolite containing cracking catalysts prepared by prior art methods produce significant yields of cracked gasoline. However, it is frequently observed that most highly active rare-earth exchanged zeolite cracking catalysts produce large quantities of gasoline of medium octane rating. Conversely, hydrogen exchanged zeolite catalysts which are particularly selective for the production of high octane gasoline fractions frequently exhibit lower activity.

Accordingly, it is an object of the present invention to provide a catalytic cracking catalyst which is both highly active and selective for the production of high octane gasoline.

It is another object to provide a method for preparing commercial quantities of zeolite promoted cracking catalysts which are capable of cracking petroleum feedstocks at a high rate of conversion to obtain substantial yields of high octane gasoline.

It is yet another object to provide a thermally stable highly active aluminum exchanged type Y zeolite which contains very low levels of sodium ion.

It is still another object to provide an economically feasible procedure for producing aluminum exchanged thermally stabilized zeolites which have particularly low residual sodium content.

These and still further objects of the present invention will become readily apparent to one skilled in the art in the following detailed description and examples.

Broadly, my invention contemplates the preparation of novel catalytically active aluminum exchanged crystalline alumino-silicate type Y zeolites which may be used to prepare active, high octane gasoline selective cracking catalysts.

More specifically, I have found that improved gasoline selective zeolites may be prepared by the following procedure.

(1) A sodium type Y zeolite (NaY) is exchanged with an ammonium salt solution to lower the soda ($Na_2O$) about 4 percent by weight.

(2) The ammonium exchanged zeolite ($NH_4NaY$) is calcined at a temperature of from 538° to 815° C.

(3) The calcined zeolite is then reacted with an acid-aluminum salt solution at a pH of from about 3.7 to 2.0 to lower the soda content of the zeolite to below about 0.8 percent by weight.

The zeolite prepared by way of the above procedure may be combined with an inorganic oxide matrix either after the acid-aluminum salt exchange, i.e. after step (3), or after calcination, i.e. after step (2). When the calcined zeolite of step (2) is combined with the matrix, the combined calcined zeolite/matrix mixture is subjected to treatment with the acid aluminum salt solution.

The sodium type Y zeolite used in the practice of the present invention possesses a silica to alumina ratio of from about 4.7 to 5.2 and a unit cell dimension of from about 24.60 to 24.65. Typical soda Y zeolites contain from about 20 to 22 percent by weight alumina ($Al_2O_3$), 68 to 65 percent by weight silica ($SiO_2$), and 13 to 12 percent by weight sodium ($Na_2O$). Sodium type Y zeolites are readily obtained from commercial sources.

The sodium salt solution which is used to reduce the sodium level of the initial sodium Y zeolite is preferably ammonium sulfate. However, it is contemplated that solutions of ammonium chloride or ammonium nitrate may be used. An ammonium salt solution contains typically from about 3 to 10 percent by weight of the salt dissolved in water. The ammonium salt solution is contacted with the sodium Y zeolite for a period of from about 10 to 120 minutes, preferably at a temperature ranging from about 60° to 100° C. In order to obtain the desired level of soda removal, i.e. reduction of the $Na_2O$ content to below 4 percent by weight, preferably below 3 percent by weight. Typically the sodium Y zeolite is contacted with from about 1 to 3 batches of the ammonium salt solution.

Subsequent to contact with the ammonium salt solution, the $NaNH_4Y$ zeolite is heated, i.e. calcined, at a temperature of from about 538° to 815° C. Preferably, the calcination is conducted for a period of from about 120 to 180 minutes utilizing conditions wherein the zeolite is maintained in a self-steaming condition. During the calcination step, the initial unit cell dimension of the sodium Y zeolite is reduced by about 0.2 A°, that is, the unit cell dimension of the calcined zeolite will be in the range of from about 24.45 to 24.52 A°.

The calcined zeolite is then subjected to treatment (exchange/reaction) with an acid aluminum salt solution. Preferably, the salt solution is aluminum sulfate which has been acidified with sufficient sulfuric acid to obtain a pH of from about 3.7 to 2.0 and preferably 2.7. While aluminum sulfate is the preferred acid salt, it is contemplated that aluminum chloride or aluminum nitrate may be used with appropriate additions of hydrochloric or nitric acid.

As a result of the contact with the acid aluminum salt, the rest of the residual sodium ions present in the calcined zeolite are exchanged with aluminum ions. Preferably, the contact with the acid aluminum salt is repeated using successive fresh batches of aluminum salt solution until the sodium content of the zeolite is reduced to below 1 percent by weight $Na_2O$ and preferably below 0.8 percent by weight $Na_2O$. As a result of this exchange step, the unit cell of the calcined zeolite is 24.52 to 24.45. Furthermore, it is noted that as a result of the processing described above, the alumina content of the zeolite is from about 23 to about 13 percent by weight depending on the pH of the exchanging slurry. It is also observed that as alumina is removed from the zeolite, the overall surface area of the zeolite, which is initially 650 m²/g, is increased. This indicates that the overall crystalline structure of the zeolite remains intact. In many instances zeolites which are subjected to calcination and acid exchange conditions lose crystallinity.

Subsequent to exchange with the aluminum salt solution, the zeolite is subjected to exchange with an ammonium salt solution, typically, ammonium sulfate. This ammonium sulfate exchange results in further sodium removal to produce a zeolite composition which contains less than about 0.5 percent by weight Na$_2$O.

The zeolites prepared by the procedure described above are advantageously combined with an inorganic oxide matrix to obtain highly active, gasoline selective cracking catalyst. Typically, the matrix component comprises clay and an inorganic oxide binder such as silica, alumina, silica-alumina sols, and silica, alumina, silica-alumina gels. Combining of the zeolite with the matrix component may be achieved by the procedures set forth in U.S. Pat. Nos. 3,957,689; 3,867,308; and 3,912,619. Hydrocarbon cracking catalysts which include the zeolite of the present invention contain from about 30 to 40 percent by weight zeolite, from about 45 to 35 percent by weight clay and the balance inorganic oxide sol or gel binder. Furthermore, the catalysts may contain components such as alumina and minor quantities of platinum which result in the preparation of catalysts which oxidize carbon monoxide and/or control sulfur emissions from the catalytic cracking process. Furthermore, it is contemplated that the novel aluminum thermal exchanged zeolites of the present invention may be combined with other zeolites such as rare-earth exchanged and type Y zeolites to obtain a catalyst having multiple zeolite promoters.

The catalysts obtained using my novel zeolite are highly active. Furthermore, the catalysts are capable of producing gasoline fractions which possess an unusually high octane when the catalytic cracking process is operated at relatively high conversion, i.e. from about 60 to 70 percent conversion. The gasoline fractions obtained using the present catalysts will possess an octane rating of from about 90 to 91 research and from about 78 to 79 motor.

Having described the basic aspects of the present invention, the following examples are given to illustrate specific preferred embodiments.

EXAMPLE I (a) A sodium type Y zeolite (NaY) was exchanged with ammonium sulfate solution to obtain a sodium/ammonium type Y zeolite (Na,NH$_4$Y) which contained 3.55 weight percent Na$_2$O. The Na,NH$_4$Y was heated at 1250° F. for 3 hours to obtain a calcined Na,NH$_4$Y which has the following properties:
Surface Area—757 m²/g
Crystallinity—97% of standard
Unit Cell—24.49 A°
SiO$_2$—71.99 wt. %
Al$_2$O$_3$—23.46 wt. %

(b) The calcined Na,NH$_4$Y zeolite prepared in (a) above was treated with a 0.05 M aluminum sulfate solution for 45 minutes at pH 3.3. This product was then exchanged twice with dilute ammonium sulfate solution to obtain a zeolite having the following properties:

Crystallinity—89% of standard
Na$_2$O—0.26 wt. %
SiO$_2$—73.4 wt. %
Al$_2$O$_3$—23.62 wt. %

(c) A second sample of the calcined Na, NH$_4$Y prepared in (a) above was treated with a 0.05 M aluminum sulfate solution for 45 minutes at pH 2.6 at 95° C., followed by two exchanges with dilute ammonium sulfate solution. The resulting zeolite has the following properties:

Crystallinity—105% of standard
Na$_2$O—0.25 wt. %
SiO$_2$—80.6 wt. %
Al$_2$O$_3$—16.1 wt. %

EXAMPLE II (a) A sample of cracking catalyst was prepared and evaluated for cracking activity which contained 40 weight percent of the zeolite prepared in Example I, paragraph (c). The catalyst included a clay/silica-alumina sol matrix which comprised 35 weight percent clay and 25 weight percent silica. The catalyst sample had the following properties after treatment with 20 percent steam, at 1520° F. for 12 hours.
Na$_2$O—0.17 wt. %
Surface area—258 m²/g
N$_2$ Pore Volume—0.22 cc/g
H$_2$O Pore Volume—0.42 cc/g
Microactivity*—67.5 volume % conversion
Unit Cell—24.22 A°

*Determined at 16 wt. hourly space velocity. 3 catalyst/oil ratio at 900° F.

(b) A catalyst sample was prepared by combining 40 weight percent of the calcined Na,NH$_4$Y zeolite of Example I (a) in the matrix described in (a) above. The catalyst was spray dried, and then washed with water at 140° F. Ten pounds of the washed catalyst was rinsed three times at 140° F. with 10 pounds dilute (3°Be') ammonium sulfate solution at pH 5. The catalyst was then washed with dilute ammonium hydroxide solution at pH 7.5.

(c) A catalyst sample was prepared by a procedure similar to that set forth in (b) above. However, after washing with water, 10 pounds of the catalyst was mixed with 35 pounds of aluminum sulfate solution which contained 0.5 weight percent Al$_2$O$_3$. The exchange was conducted at pH 2.7 and 140° F. The catalyst was then washed with 10 pounds of dilute ammonium sulfate solution at pH 5. The catalyst was reslurried with 34 pounds of the aluminum sulfate solution, and finally washed with dilute ammonium hydroxide solution.

(d) A procedure similar to that set forth in paragraph (c) was followed. However, after washing with water 10 pounds of the catalyst was rinsed three times with 34 pounds of aluminum sulfate solution which contained 0.5 weight percent Al$_2$O$_3$ at pH 2.6. The catalyst was then washed with dilute ammonium hydroxide solution at pH 7.5.

The catalysts prepared in paragraphs (b), (c) and (d) of Example II had the following properties:

| Catalyst (Example) | II(b) | II(c) | III(d) |
|---|---|---|---|
| Total Volatiles (wt. %) | 10.20 | 11.03 | 10.33 |
| Na$_2$O (wt. %) | 0.42 | 0.21 | 0.78 |
| Surface Area (m²/g) | 195 | 203 | 200 |
| Microactivity (% conversion) | 65.4 | 68.7 | — |

EXAMPLE III

To demonstrate the octane enhancing selectivity of the catalysts of the present invention, a sample of the catalyst prepared in Example II(c) was compared with a sample of the non-aluminum sulfate exchanged catalyst of Example II(b). The following fluid cracking catalyst pilot unit data was developed at 40 wt. hourly space velocity, 4 catalyst/oil ratio at 950° F. after deactivity the catalysts using 20 percent steam at 1520° F. for 12 hours:

| Catalyst (Example) | II(c) | II(b) |
|---|---|---|
| Conversion, Vol. % | 62.0 | 62.0 |
| $C_5^+$ Gasoline, Vol. % fresh feed | 52.5 | 54.0 |
| Octane No. | | |
| Research | 90.3 | 88.4 |
| Motor | 78.9 | 77.9 |
| Light Cycle Oil, Vol. % fresh feed | 25.9 | 26.5 |
| Coke, Wt. % fresh feed | 2.7 | 2.7 |

It is concluded from the above data that the aluminum sulfate exchanged catalyst of the present invention (Catalyst II(c)) produces gasoline of higher octane rating than the non-aluminum sulfate exchanged catalyst (Catalyst II(b)).

I claim:

1. In a method for catalytically cracking hydrocarbons to obtain high octane gasoline fractions wherein said hydrocarbons are reacted under catalytic cracking conditions with a catalyst which comprises a zeolite mixed with an inorganic oxide matrix, the improvement comprising using a catalyst prepared by the process comprising:
   (a) Exchanging a sodium type Y zeolite with an ammonium salt solution to lower the sodium content of said zeolite to below about 4 percent by weight $Na_2O$;
   (b) calcining the ammonium exchanged zeolite at a temperature of from about 537° to 815° C.;
   (c) mixing said calcined zeolite with an inorganic oxide matrix and water;
   (d) spray drying said mixture; and
   (e) reacting said spray dried mixture with an acid aluminum salt solution having a pH of from about 2.0 to 3.7 to lower the sodium content to below about 1.0 percent by weight $Na_2O$.

2. The method of claim 1 wherein said catalyst is a fluid cracking catalyst.

3. The method of claim 1 wherein the aluminum salt used at step (e) is aluminum sulfate.

4. The method of claim 1 wherein said ammonium salt used at step (a) is ammonium sulfate.

5. The method of claim 1 wherein the zeolite comprises from about 30 to 40 percent by weight of said catalyst.

6. The method of claim 1 wherein the matrix comprises clay and an inorganic oxide binder selected from the group consisting of silica, alumina, silica-alumina sols and gels.

* * * * *